(12) United States Patent
Park et al.

(10) Patent No.: US 12,211,311 B2
(45) Date of Patent: Jan. 28, 2025

(54) OBJECT RECOGNITION METHOD AND OBJECT RECOGNITION APPARATUS

(71) Applicant: Samsung Electronics Co., Ltd., Suwon-si (KR)

(72) Inventors: Sungheon Park, Suwon-si (KR); Youngjun Kwak, Seoul (KR); Byungin Yoo, Seoul (KR); Solae Lee, Suwon-si (KR); Yong-Il Lee, Daejeon (KR); Hana Lee, Suwon-si (KR); Jiho Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 441 days.

(21) Appl. No.: 17/106,807

(22) Filed: Nov. 30, 2020

(65) Prior Publication Data
US 2021/0397819 A1 Dec. 23, 2021

(30) Foreign Application Priority Data

Jun. 19, 2020 (KR) .................. 10-2020-0074868

(51) Int. Cl.
| | |
|---|---|
| G06V 40/16 | (2022.01) |
| G06F 18/21 | (2023.01) |
| G06F 18/24 | (2023.01) |
| G06N 3/08 | (2023.01) |
| G06T 7/70 | (2017.01) |
| G06V 10/44 | (2022.01) |
| G06V 10/82 | (2022.01) |

(52) U.S. Cl.
CPC .......... *G06V 40/161* (2022.01); *G06F 18/21* (2023.01); *G06F 18/24* (2023.01); *G06N 3/08* (2013.01); *G06T 7/70* (2017.01); *G06V 10/454* (2022.01); *G06V 10/82* (2022.01); *G06V 40/168* (2022.01); *G06V 40/172* (2022.01); *G06T 2207/30201* (2013.01)

(58) Field of Classification Search
CPC ......... G06F 18/21; G06F 18/24; G06N 20/10; G06N 20/20; G06N 3/044; G06N 3/045; G06N 3/08; G06T 2207/30201; G06T 7/70; G06V 10/454; G06V 10/82; G06V 40/161; G06V 40/168; G06V 40/172
See application file for complete search history.

(56) References Cited

U.S. PATENT DOCUMENTS

| | | |
|---|---|---|
| 7,577,626 B1 | 8/2009 | Mountrakis |
| 10,217,029 B1 | 2/2019 | Van Rensburg et al. |

(Continued)

FOREIGN PATENT DOCUMENTS

| | | | |
|---|---|---|---|
| CN | 108491784 A * | 9/2018 | ......... G06K 9/00268 |
| KR | 10-2018-0037436 A | 4/2018 | |

(Continued)

*Primary Examiner* — Manuchehr Rahmjoo
(74) *Attorney, Agent, or Firm* — NSIP Law

(57) ABSTRACT

Disclosed is an object recognition method and object recognition apparatus. The object recognition method may include detecting an object region comprising an object in an input image, determining scores corresponding to regions of the object region, determining weights based on the scores and detection information of the object region, determining a final score based on the scores and the determined weights, and determining a result of recognizing the object based on the final score.

20 Claims, 8 Drawing Sheets

(56) References Cited

U.S. PATENT DOCUMENTS

| | | | |
|---|---|---|---|
| 10,410,322 B2 | 9/2019 | Viswanathan et al. | |
| 10,482,603 B1 | 11/2019 | Fu et al. | |
| 2009/0141940 A1* | 6/2009 | Zhao | G06T 7/248 382/103 |
| 2010/0323793 A1* | 12/2010 | Andall | A63F 13/40 463/43 |
| 2015/0023606 A1* | 1/2015 | Morishita | G06F 18/24 382/219 |
| 2016/0174902 A1 | 6/2016 | Georgescu et al. | |
| 2017/0011195 A1* | 1/2017 | Arshad | G16H 30/20 |
| 2017/0068871 A1 | 3/2017 | Abdulkader et al. | |
| 2017/0169328 A1 | 6/2017 | Modha | |
| 2018/0285629 A1* | 10/2018 | Son | G06V 10/809 |
| 2018/0333068 A1* | 11/2018 | Beck | A61B 5/055 |
| 2018/0373924 A1* | 12/2018 | Yoo | G06V 10/454 |
| 2019/0035069 A1* | 1/2019 | Yin | G06V 10/454 |
| 2019/0251335 A1* | 8/2019 | Han | G06V 40/166 |
| 2020/0143245 A1* | 5/2020 | Pan | G06N 3/084 |

FOREIGN PATENT DOCUMENTS

| | | |
|---|---|---|
| KR | 10-2018-0064863 A | 6/2018 |
| KR | 10-2019-0016733 A | 2/2019 |
| KR | 10-2019-0041922 A | 4/2019 |
| KR | 10-2019-0076288 A | 7/2019 |
| KR | 10-2020-0008251 A | 1/2020 |

\* cited by examiner

OBJECT RECOGNITION METHOD AND OBJECT RECOGNITION APPARATUS

CROSS-REFERENCE TO RELATED APPLICATIONS

This application claims the benefit under 35 USC § 119(a) of Korean Patent Application No. 10-2020-0074868 filed on Jun. 19, 2020 in the Korean Intellectual Property Office, the entire disclosure of which is incorporated herein by reference for all purposes.

BACKGROUND

Field

The following description relates to object recognition technology using a classifier.

2. Description of Related Art

Research is being conducted on technology for performing user authentication using a face or a fingerprint of a user through a recognition model, such as a classifier. The recognition model may be based on a neural network. A neural network, or an artificial neural network, may include a statistical learning algorithm that has an ability to solve a problem, the statistical learning algorithm including artificial neurons (nodes) that forms a network through synaptic combinations and changes a connection strength of the synapses through training. The neural network may be used to output a recognition result corresponding to an input pattern of input information. The neural network has a capability to generate mapping between an input pattern and an output pattern through learning and to generate a relatively correct output value for an input pattern yet to be used for learning based on learning results.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an object recognition method, including detecting an object region comprising an object in an input image, determining scores corresponding to regions of the object region, determining weights based on the scores and detection information of the object region, determining a final score based on the scores and the determined weights, and determining a result of recognizing the object based on the final score.

The detection information of the object region may include a position of the object region in the input image.

The position may include any one or any combination of a width of the object region, a height of the object region, and coordinates of a reference point related to the object region.

The weights may adaptively change according to the detection information of the object region and the scores.

The determining of the weights may include obtaining the weights using a neural network model that receives the scores and the detection information of the object region and outputs the weights.

The determining of the scores may include determining the scores using classifiers, and the determining of the weights may include determining the weights based on the scores, the detection information of the object region, and feature information obtained from at least one of the classifiers.

The feature information may include a feature value output from an intermediate layer of at least one of the classifiers.

The determining of the weights may include determining a first weight corresponding to a first score based on the detection information of the object region and the scores, and determining a second weight corresponding to a second score based on the detection information of the object region and the scores.

The determining of the final score may include determining the final score based on applying the first weight to the first score and applying the second weight to the second score.

The object region may correspond to a face region, and the plurality of regions may include the face region and a partial region including at least one face component in the face region.

In another general aspect, there is provided an object recognition method, including detecting an object region comprising an object in an input image, determining scores corresponding to regions of the object region, determining weights based on the scores and detection information of the object region, in response to a detected feature for the detected object region satisfying an object recognition performance decrease condition, determining a final score based on the scores and the determined weights, and determining a result of recognizing the object based on the final score.

The detection information of the object region may include a position of the object region in the input image, and the position may include any one or any combination of a width of the object region, a height of the object region, and coordinates of a reference point related to the object region.

The detected feature for the detected object region satisfying the object recognition performance decrease condition may include at least one of a plurality of object regions being detected in the input image or the detected object region corresponding to an incompletely detected object region.

The object recognition method may include determining the final score based on the scores and a fixed weight, in response to the detected feature for the detected object region not satisfying the object recognition performance decrease condition.

The determining of the weights may include obtaining the weights using a neural network model that receives the scores and the detection information of the object region and outputs the weights.

In another general aspect, there is provided an object recognition apparatus, including a processor configured to detect an object region comprising an object in an input image, determine scores corresponding to regions of the object region, determine weights based on the scores and detection information of the object region, determine a final score based on the scores and the determined weights, and determine a result of recognizing the object based on the final score.

The detection information of the object region may include a position of the object region in the input image, and the position may include any one or any combination of a width of the object region, a height of the object region, and coordinates of a reference point related to the object region.

The processor may be configured to determine the scores using classifiers, and determine the weights based on the scores, the detection information of the object region, and feature information obtained from at least one of the classifiers.

In another general aspect, there is provided an electronic device, including a camera configured to acquire an input image, and a processor configured to perform object recognition based on the input image, wherein the processor is configured to detect an object region comprising an object in the input image, determine scores corresponding to regions of the object region, determine weights based on the scores and detection information of the object region, determine a final score based on the scores and the determined weights, and determine a result of recognizing the object based on the final score.

Other features and aspects will be apparent from the following detailed description, the drawings, and the claims.

Figure 1:
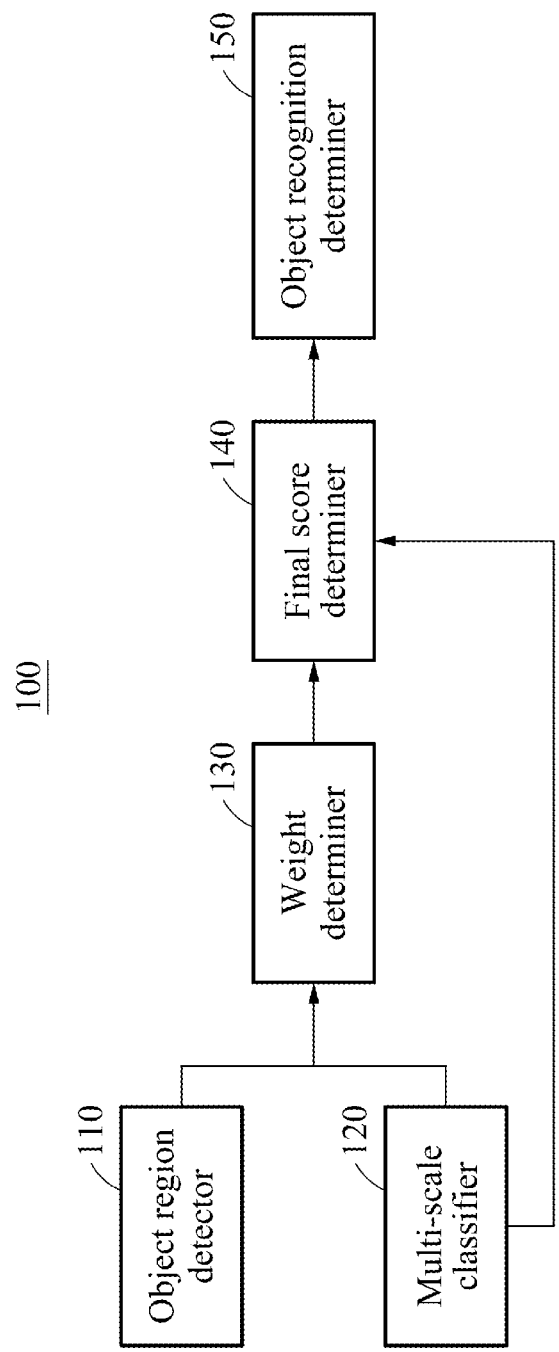
FIG. 1 illustrates an example of an object recognition apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, examples will be described in detail with reference to the accompanying drawings. When describing the examples with reference to the accompanying drawings, like reference numerals refer to like constituent elements and a repeated description related thereto will be omitted.

FIG. 1 illustrates an example of an object recognition apparatus.

An object recognition apparatus 100 recognizes an object in an input image, and may be used, for example, to recognize a face of a user in an input image including the face. However, the scope of examples is not limited thereto, and the object recognition apparatus 100 may be applied to detect various objects other than a face. Herein, the term "input image" may also be referred to as "image", "target image", or "query image". The object recognition apparatus 100 may be mounted on or incorporated in, for example, an identification device, a verification device, an authentication devices, a mobile phone, a smart phone, a smart TV, a computer, a desk top, a laptop, a tablet PC, a gaming device, a personal digital assistant (PDA), a set-top box, a wearable device, an intelligent vehicle, a security system, a security kiosk, a smart home system, a smart home device, and a smart home appliance.

Referring to FIG. 1, the object recognition apparatus 100 may include an object region detector 110, a multi-scale classifier 120, a weight determiner 130, a final score determiner 140, and an object recognition determiner 150. The object region detector 110 may detect an object region in an input image. The object region may be detected, for example, in the form of a bounding box containing an object.

The object region detector 110 may detect a face region in the input image using a classifier, such as, for example, Haar-based cascade AdaBoost classifier, a neural network-based classifier, or a support vector machine (SVM). However, the scope of examples is not limited thereto, and a face verification device may detect the face region in the input image using various face region detection techniques.

The multi-scale classifier 120 may determine scores for a plurality of regions extracted from the input image. The multi-scale classifier 120 may include a plurality of neural network models, such as, for example, convolutional neural networks (CNNs), and recurrent neural networks (RNNs), wherein each of the neural network models may receive pixel values for the input regions and output the scores corresponding to the input regions. The term "score" may also be referred to as a feature value, a feature vector, a probability value, or an expected value, for example.

The weight determiner 130 may determine weights to be applied to the scores based on detection information of the object region detected by the object region detector 110 and information about the scores output from the multi-scale classifier 120. The weight determiner 130 may be a neural network model that receives the information about the scores and the detection information of the object region and outputs the weights. The detection information of the object region may include parameters defining a position of the object region in the input image. The parameters may include information about a width of the object region, a height of the object region, and coordinates of a reference point, such as, for example, a central point, a vertex, or an edge of the object region.

The weight determiner 130 may be trained in advance such that an effect of a classifier with the best performance, from among a plurality of classifiers included in the multi-scale classifier 120, increases in determining a final score according to an object recognition performance decrease condition, which will be described later with reference to FIG. 8. That is, a weight to be applied to a score output from the classifier with the best performance is relatively increased.

The final score determiner 140 may determine the final score based on the scores determined by the multi-scale classifier 120 and the weights determined by the weight determiner 130. The final score determiner 140 may apply the respective weights to the scores, and determine the final score based on a result of applying the weights. For example, the final score may be defined as an ensemble result obtained based on the scores and the weights, or as a weighted sum of the scores.

The object recognition determiner 150 may determine an object recognition result based on the final score determined by the final score determiner 140. For example, the object recognition determiner 150 determines the object recognition result to be "success" in response to the final score being greater than a threshold, and determine the object recognition result to be "failure" in response to the final score being less than or equal to the threshold. For example, in the case of face recognition, an operation of allowing an access of the user may be performed if the recognition result is determined to be "success", and an operation of blocking an access of the user may be performed if the recognition result is determined to be "failure".

Values of the weights output from the weight determiner 130 described above may adaptively change according to the detection information of the object region and the scores. In an example, the final score is determined using a weight determined adaptive to the detection position of the detected region, rather than a fixed weight. When training the multi-scale classifier 120 using training images, there is a limit to obtaining training images reflecting object regions of various detection positions. If a fixed weight is used without considering the detection position of the object region when determining the final score, the recognition performance may decrease for a case in which an object region is detected at a detection position not reflected in or rarely reflected in training images. However, when the weights are adaptively changed by the weight determiner 130 according to the detection position of the object region, the object recognition may be robust to a change in the detection position of the object region, whereby the recognition performance may improve.

Figure 2:
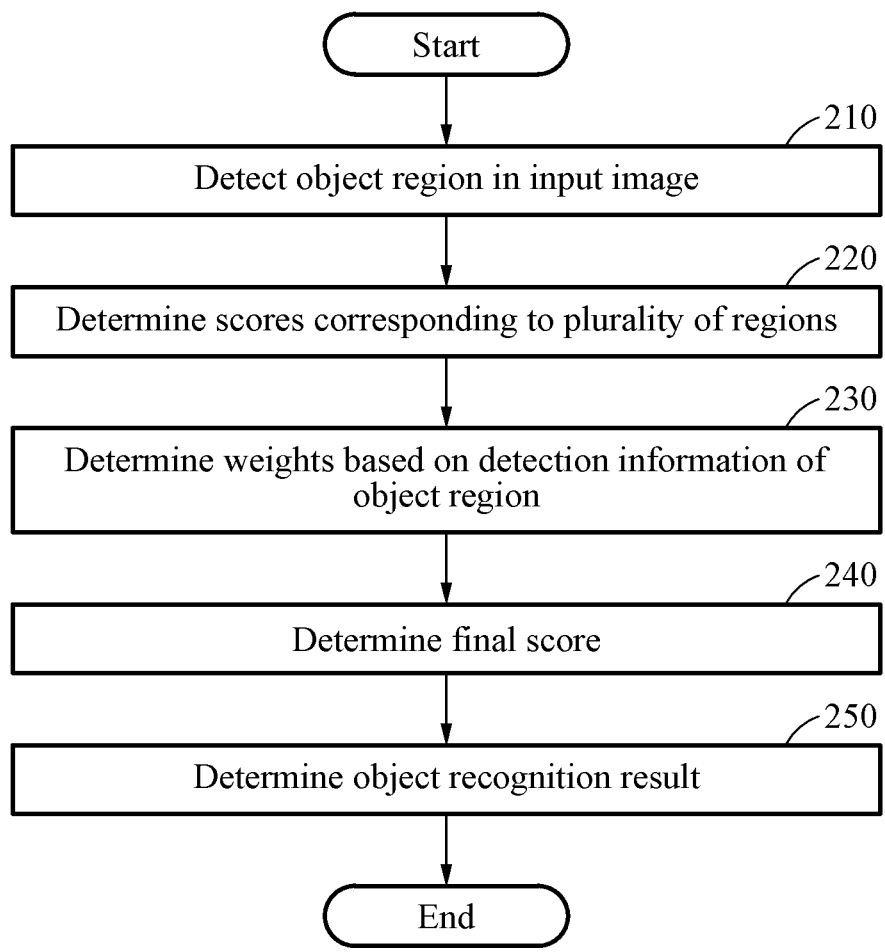
FIG. 2 illustrates an example of an object recognition method.

FIG. 2 illustrates an example of an object recognition method. The object recognition method may be performed by the object recognition apparatus described herein. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer, such as a processor, that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

Referring to FIG. 2, in operation 210, the object recognition apparatus may detect an object region including an object in an input image. The object recognition apparatus may receive the input image as a target for object recognition, and extract the object region including the object as a partial region in the input image. The input image may be acquired by an image acquisition device such as, for example, a digital still camera, a video camera, or an infrared camera. The object region may correspond to, for example, a face region or an eye region. In an example, the object recognition apparatus may detect the face region in the input image.

In operation 220, the object recognition apparatus may determine scores corresponding to a plurality of regions of the object region. The object recognition apparatus may determine the scores using classifiers included in a multi-scale classifier. The multi-scale classifier may include classifiers trained with different scales, for example, classifiers trained with different scales for different regions in an image.

For ease of description, if it is assumed that the multi-scale classifier includes a first classifier and a second classifier, the first classifier and the second classifier may have different structures, or different characteristics or parameters. The number of classifiers, however, may be varied without departing from the sprit and scope of the disclosure. The object recognition apparatus may determine a first score corresponding to a first region of the object region using the first classifier, and determine a second score corresponding to a second region of the object region using the second classifier included in the multi-scale classifier. For example, when the object region corresponds to a face region, the first region may correspond to a partial region including at least one face component (for example, an eye, an eyebrow, a nose, or a mouth) in the face region, and the second region may correspond to the entire detected face region or a region larger than the face region. In an examples, the multi-scale classifier may include three or more classifiers, wherein each classifier may receive a predetermined region extracted from the input image and output a respective corresponding score. In this example, the following operations may be performed based on three or more scores output from the classifiers In operation 230, the object recognition apparatus may determine weights to be applied to the scores based on detection information of the object region and the scores. The detection information of the object region includes parameters defining a position of the object region in the input image. The object recognition apparatus may determine a weight to be applied to at least one of the scores based on the parameters and the scores output from the multi-scale classifier.

The object recognition apparatus may determine the weights to be applied to the scores, based on the detection information of the object region and the scores determined in operation 220. For example, the object recognition apparatus may determine a first weight corresponding to the first score and a second weight corresponding to the second score based on the detection information of the object region and the scores. The weights may be determined using a neural network model that receives the first score, the second score, and the detection information of the object region and outputs the weights corresponding to the scores. The neural network model may be trained to output the weights corresponding to the scores based on the input.

In another example, the object recognition apparatus may determine the weights based on feature information obtained from at least one of the classifiers included in the multi-scale classifier, the scores, and the detection information of the object region. Here, the feature information may include, for example, a feature value output from an intermediate layer of at least one of the classifiers. In this example, the weights may be determined using a neural network model that receives the scores, the detection information of the object region, and the feature value output from the intermediate layer and outputs the weights corresponding to the scores.

In operation 240, the object recognition apparatus may determine a final score based on the scores output from the multi-scale classifier and the weights determined in operation 230. When it is assumed that the weights are determined respectively for the first score and the second score, the object recognition apparatus may determine the final score based on a result of applying the first weight to the first score and a result of applying the second weight to the second score. The final score may be calculated in the form of a weighted sum based on the scores and the weights.

In operation 250, the object recognition apparatus may determine a result of recognizing the object based on the determined final score. For example, the object recognition apparatus may identify the type of the object in the input image based on the final score, or determine a result of recognizing the face in the input image.

As described above, the scores output from the multi-scale classifier may be adjusted by the weights determined based on the detection information of the object region, and object recognition may be performed robust against a condition under which an object region is detected, through such score adjustment.

Figure 3:
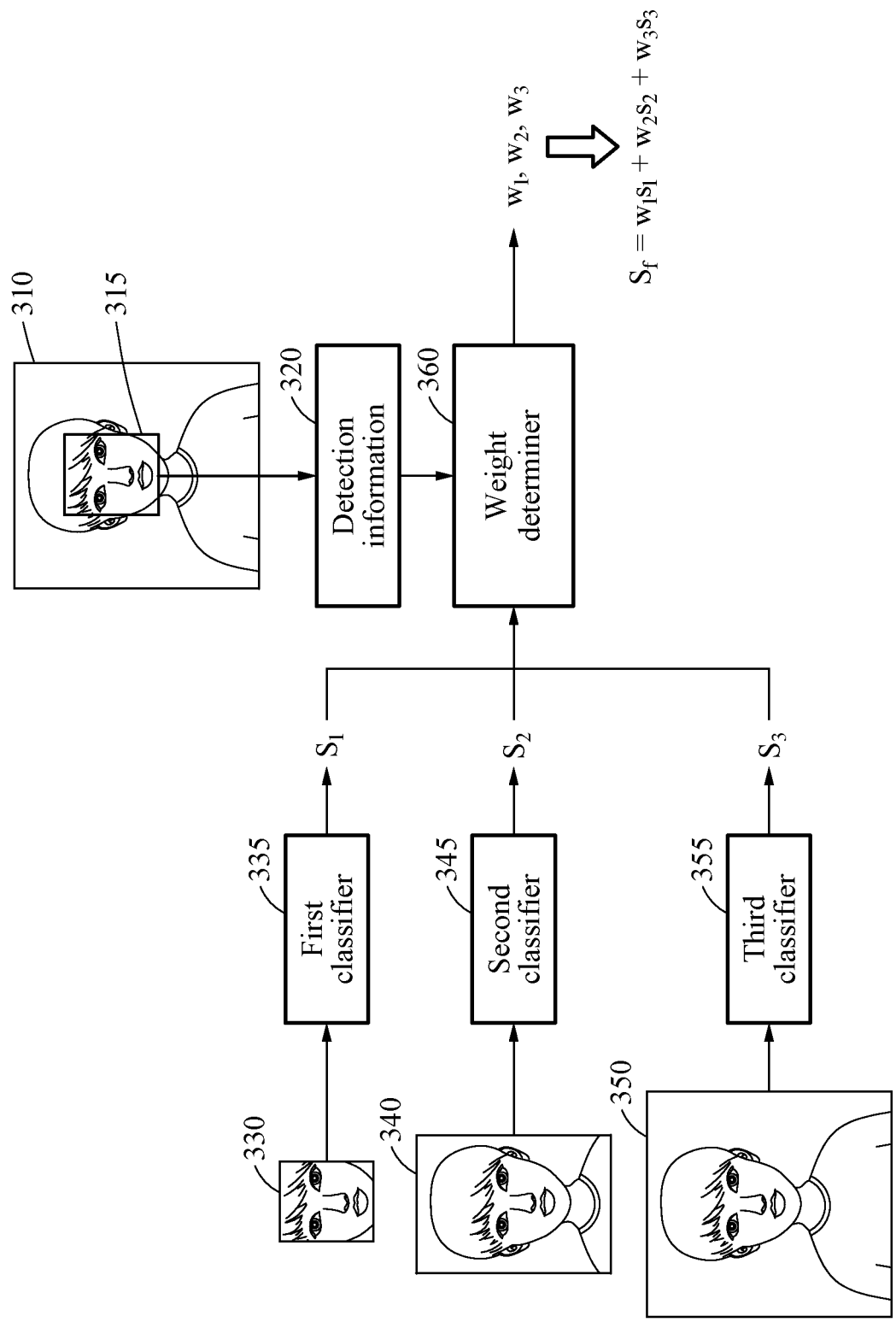
FIG. 3 illustrates an example of determining a final score based on detection information of an object region.

FIG. 3 illustrates an example of determining a final score based on detection information of an object region.

Referring to FIG. 3, the object recognition apparatus may detect an object region 315 including an object in an input image 310 and obtain detection information 320 related to detection of the object region 315. For example, the detection information 320 may include information about a width of the object region 315, a height of the object region 315, and coordinates (x, y) of a reference point (for example, a center point or upper left corner) related to the object region 315.

Here, it is assumed that a multi-scale classifier includes a first classifier 335, a second classifier 345, and a third classifier 355. Each of the first classifier 335, the second classifier 345, and the third classifier 355 may be based on a convolutional neural network model. A first region 330 of the input image 310 may be input into the first classifier 335, and the first classifier 335 may provide a first score $S_1$ corresponding to the first region 330. A second region 340 of the input image 310 may be input into the second classifier 345, and the second classifier 345 may provide a second score $S_2$ corresponding to the second region 340. A third region 350 of the input image 310 may be input into the third classifier 355, and the third classifier 355 may provide a third score $S_3$ corresponding to the third region 350. The first region 330, the second region 340, and the third region 350 may be multi-scale patch regions extracted from the input image 310. The patch regions may have different sizes or represent different regions, wherein any one of the patch regions may include another one or may at least partly overlap another one.

A weight determiner 360 may determine a weight to be applied to at least one of the first, second and third scores $S_1$, $S_2$ and $S_3$ based on detection information 320 and the first, second and third scores $S_1$, $S_2$ and $S_3$. Here, it is assumed that a first weight $w_1$, a second weight $w_2$, and a third weight $w_3$ are determined for the first score $S_1$, the second score $S_2$, and the third score $S_3$, respectively. Values of the weights $w_1$, $w_2$, and $w_3$ may change according to the detection information 320 of the object region 315. The weight determiner 360 may determine the weights $w_1$, $w_2$, and $w_3$, using a neural network model that receives the first, second, and third scores $S_1$, $S_2$, and $S_3$ and the detection information 320 and outputs the weights $w_1$, $w_2$, and $w_3$ corresponding to the first, second, and third scores $S_1$, $S_2$ and $S_3$.

The object recognition apparatus may determine a final score $S_1$ based on the first, second, and third scores $S_1$, $S_2$, and $S_3$ and the weights $w_1$, $w_2$, and $w_3$. For example, the final score $S_1$ may be determined to be a weighted sum based on the first, second, and third scores $S_1$, $S_2$, and $S_3$ and the weights $w_1$, $w_2$, and $w_3$ corresponding to the scores.

Figure 4:
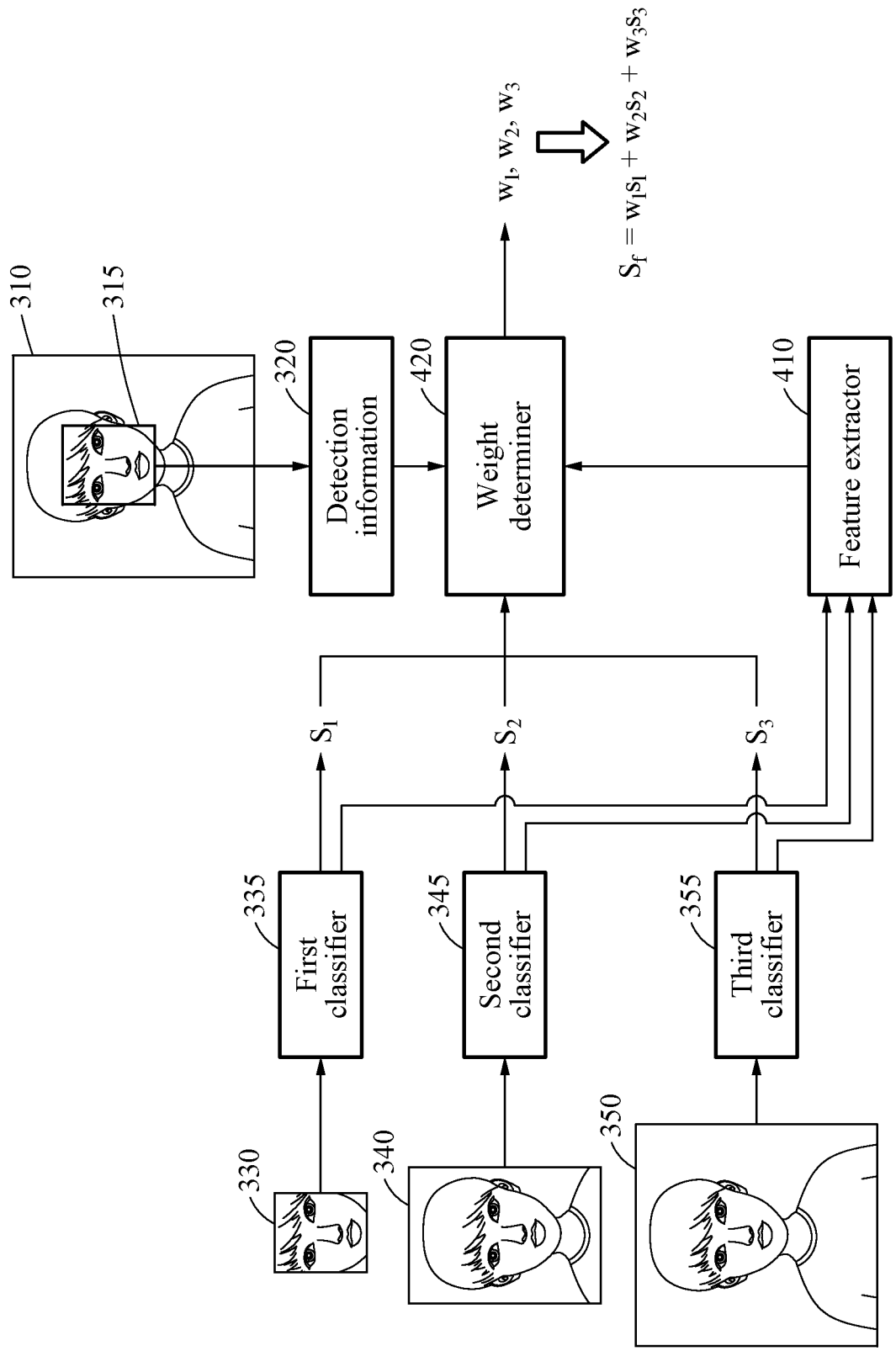
FIG. 4 illustrates an example of determining a final score based on detection information of an object region.

FIG. 4 illustrates an example of determining a final score based on detection information of an object region.

Referring to FIG. 4, similar to the example of FIG. 3, it is assumed that the object recognition apparatus detects the object region 315 in the input image 310, obtains the detection information 320 related to detection of the object region 315, and obtains the scores $S_1$, $S_2$, and $S_3$ corresponding to the patch regions 330, 340, and 350 through the first classifier 335, the second classifier 345, and the third classifier 355.

The object recognition apparatus may include a feature extractor 410, and the feature extractor 410 may obtain feature information from a multi-scale classifier. For example, the feature extractor 410 may be connected to the first classifier 335, the second classifier 345, and the third classifier 355, and obtain a first feature value output from an intermediate layer of the first classifier 335, a second feature value output from an intermediate layer of the second classifier 345 and a third feature value output from an intermediate layer of the third classifier 355. The feature extractor 410 may transmit the obtained first, second, and third feature values to a weight determiner 420.

The weight determiner 420 may determine the weights $w_1$, $w_2$, and $w_3$ to be applied to the scores $S_1$, $S_2$, and $S_3$ based on the feature information obtained by the feature extractor 410, in addition to the scores $S_1$, $S_2$, and $S_3$ and the detection information 320. Thereafter, the object recognition apparatus may determine the final score $S_1$ based on the scores $S_1$, $S_2$, and $S_3$ and the weights $w_1$, $w_2$, and $w_3$.

Figure 5:
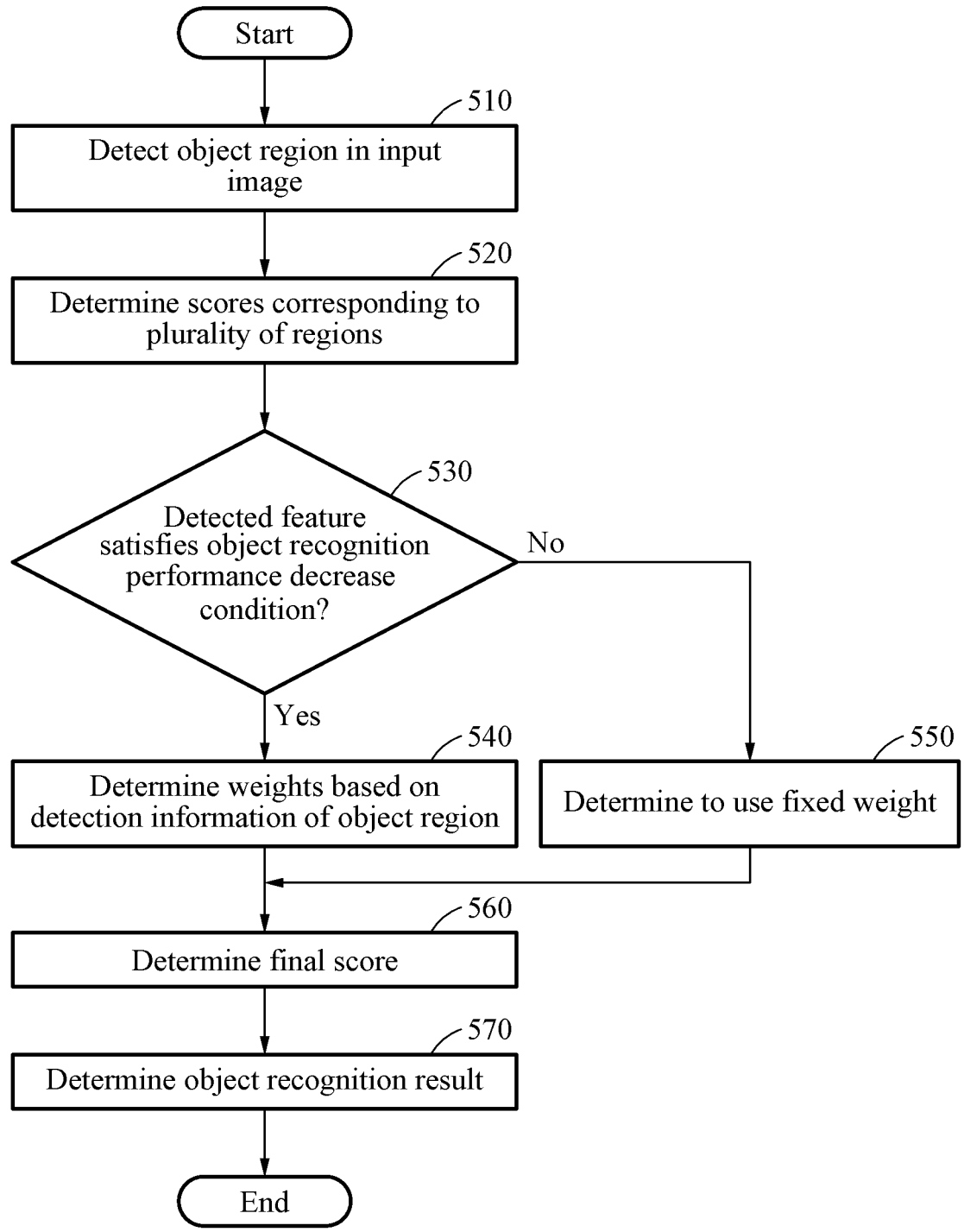
FIG. 5 illustrates an example of an object recognition method.

FIG. 5 illustrates an example of an object recognition method. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer, such as a processor, that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here.

An object recognition apparatus may determine a final score by adaptively determining weights according to an object recognition performance decrease condition of an input image, or may determine a final score based on a fixed weight. Referring to FIG. 5, in operation 510, the object recognition apparatus may detect an object region in an input image. In operation 520, the object recognition apparatus may determine scores corresponding to a plurality of regions of the object region (or the input image) by using classifiers included in a multi-scale classifier. In an example, the plurality of regions may have different ranges or different regions.

In operation 530, the object recognition apparatus may determine whether a detected feature of the detected object region satisfies an object recognition performance decrease condition. A case in which the detected feature of the object region satisfies the object recognition performance decrease condition may include, for example, a case in which a plurality of object regions are detected in the input image and a case in which the detected object region corresponds to an incompletely detected object region. The case in which the incomplete object region is detected may include a case in which the object region is detected at a predefined position (for example, in a region near the edge of the input image) or all components defining the object are not detected.

If the detected feature of the object region satisfies the corresponding object recognition performance decrease condition, in operation 540, the object recognition apparatus may adaptively determine weights based on the detection information of the object region and the scores. The object recognition apparatus may determine weights to be applied to the scores based on the scores obtained from the classifiers included in the multi-scale classifier and the detection information of the object region. Operation 540 may correspond to operation 230 of FIG. 2.

In operation 560, the object recognition apparatus may determine a final score based on the scores output from the multi-scale classifier and the weights determined in operation 540. In operation 570, the object recognition apparatus may determine a result of recognizing the object based on the final score.

In operation 530, when it is determined that the feature of the object region does not satisfy the object recognition performance decrease condition, the object recognition apparatus may use a fixed weight to determine the final score, in operation 550. In an example, the fixed weight may be predefined. In operation 560, the object recognition apparatus may determine a final score based on the scores and the fixed weight. For example, the final score may be in the form of a weighted sum which is a sum of results of applying the fixed weight to the scores. In operation 570, the object recognition apparatus may determine a result of recognizing the object based on the final score.

As described above, the object recognition apparatus may determine whether a detected feature of an object region satisfies a predetermined object recognition performance decrease condition under which the object recognition performance decreases when a fixed weight is used. The object recognition apparatus performs object recognition by adaptively determining weights based on scores and detection information of the object region under the object recognition performance decrease condition. Accordingly, the object recognition apparatus may improve the object recognition performance compared to a case of using a fixed weight all the time, thereby providing relatively high object recognition accuracy.

Figure 6:
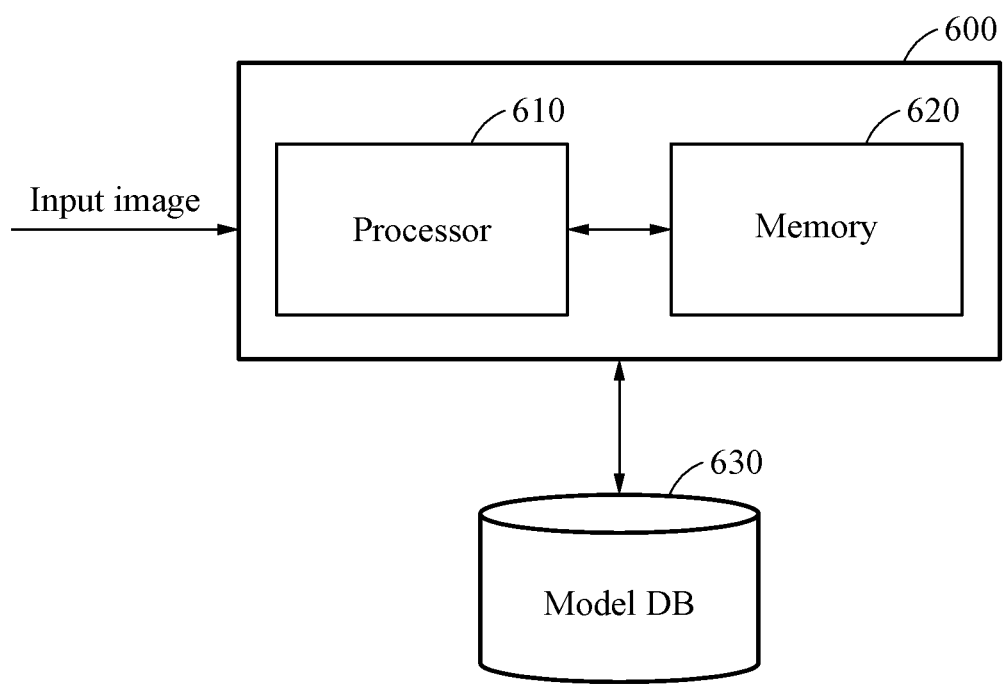
FIG. 6 illustrates an example of an object recognition apparatus.

FIG. 6 illustrates an example of an object recognition apparatus.

Referring to FIG. 6, an object recognition apparatus 600 may receive an input image for object recognition. The object recognition apparatus 600 may perform at least one of the operations described or shown in the present disclosure in relation to the object recognition method, and provide a user with a result of object recognition.

The object recognition apparatus 600 may include at least one processor 610 and a memory 620. The memory 620 may be connected to the processor 610, and store instructions executable by the processor 610, data to be computed by the processor 610, or data processed by the processor 610. The memory 620 may include a non-transitory computer-readable medium (for example, a high-speed random-access memory) and/or a non-volatile computer-readable medium (for example, a flash memory device or another non-volatile solid-state memory device). Further details regarding the memory 620 is provided below.

The processor 610 may detect an object region including an object in an input image, and obtain information on scores for a plurality of regions of the object region using a multi-scale classifier. For example, the processor 610 may determine a first score corresponding to a first region of the input image using a first classifier, and determine a second score corresponding to a second region of the input image using a second classifier. The multi-scale classifier including the first classifier and the second classifier may be stored in a model database 630.

The processor 610 may determine weights to be applied to the scores based on the scores for the plurality of regions and detection information of the object region. The detection information of the object region may include parameters defining a position of the object region detected in the input image. In another example, the processor 610 may determine the weights based on the scores and the detection information of the object region and further on feature information obtained from at least one of the classifiers. The processor 610 may determine a final score based on the scores and the determined weights, and determine a result of recognizing the object based on the final score. For example, the processor 610 may determine, to be the final score, a weighted sum calculated based on the scores and the weights. The processor 610 may determine object recognition to be "success" in response to the final score being greater than or equal to a threshold, and determine object recognition to be "failure" in response to the final score being less than the threshold.

Figure 7:
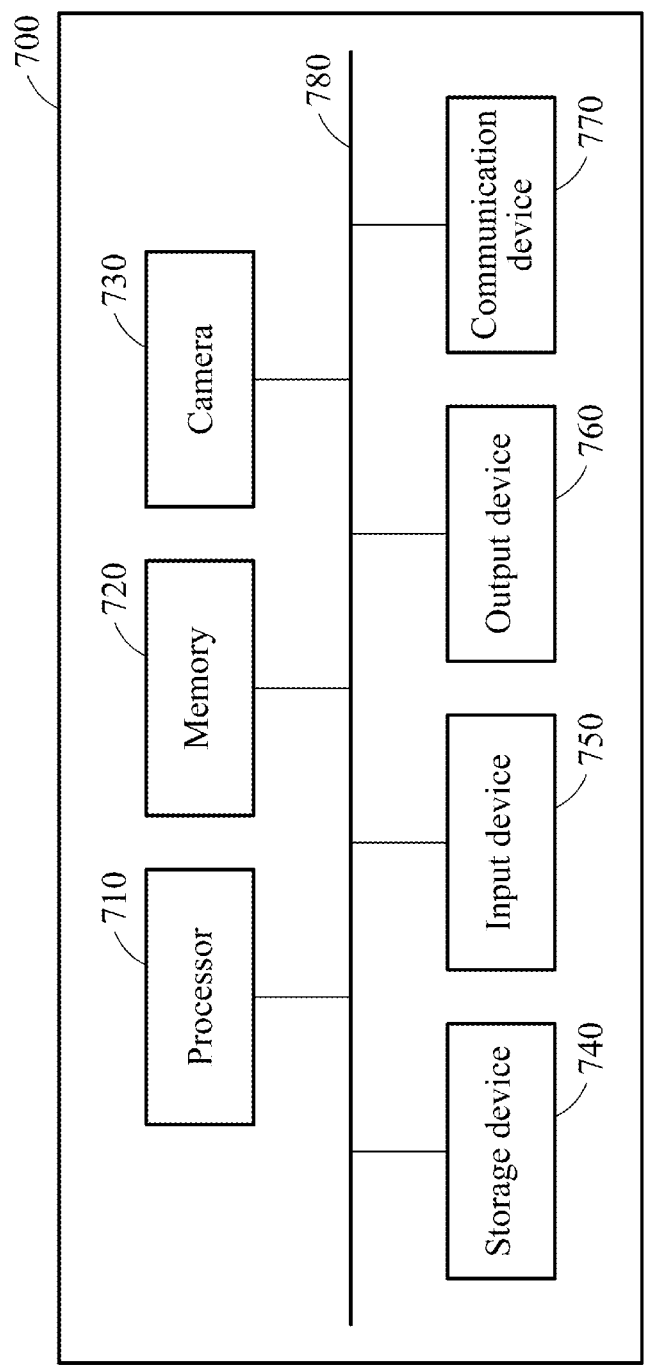
FIG. 7 illustrates an example of an electronic device.

FIG. 7 illustrates an example of an electronic device incorporating the object recognition apparatus.

The object recognition apparatus described in the present disclosure may be included and operate in an electronic device 700, and the electronic device 700 may perform at least one of the operations that may be performed by the object recognition apparatus. The electronic device 700 may be device, such as, for example, an identification device, a verification device, an authentication devices, a mobile phone, a smart phone, a smart TV, a computer, a desk top, a laptop, a tablet PC, a gaming device, a personal digital assistant (PDA), a set-top box, a wearable device, an intelligent vehicle, a security system, a security kiosk, a smart home system, a smart home device, and a smart home appliance.

Referring to FIG. 7, the electronic device 700 may include a processor 710, a memory 720, a camera 730, a storage device 740, an input device 750, an output device 760, and a communication device 770. The processor 710, the memory 720, the camera 730, the storage device 740, the input device 750, the output device 760, and the communication device 770 may communicate with each other through a communication bus 780.

The camera 730 may capture a still image, a video image, or both. The camera 730 may acquire an input image for object recognition. The acquired image may be, for example, a color image, a black-and-white image, or an infrared image.

The processor 710 may execute instructions or functions to be executed in the electronic device 700. For example, the processor 710 may process the instructions stored in the memory 720 or the storage device 740. The processor 710 may perform object recognition based on the input image acquired by the camera 730 or other images, and may perform the at least one operation described above with reference to FIGS. 1 to 6.

The storage device 740 includes a computer-readable storage medium or computer-readable storage device. The storage device 740 may include a model database to store a multi-scale classifier. The storage device 740 may include a magnetic hard disk, an optical disk, a flash memory, an erasable programmable read-only memory (EPROM), a floppy disk, or other types of non-volatile memories known in the art. Further details regarding the storage device 740 is provided below.

The input device 750 may receive an input from a user through a gesture, a tactile, video, audio, or touch input. For example, the input device 750 may include a keyboard, a mouse, a touch screen, a microphone, or any other device capable of detecting the input from the user and transmits the detected input to the electronic device 700.

The output device 760 may provide an output of the electronic device 700 to the user through a visual, auditory, or tactile channel. The output device 760 may include, for example, a liquid crystal display, a light emitting diode (LED) display, a touch screen, a speaker, a vibration generating device, or any other device capable of providing the output to the user.

The communication device 770 may communicate with an external device through a wired or wireless network.

Figure 8:
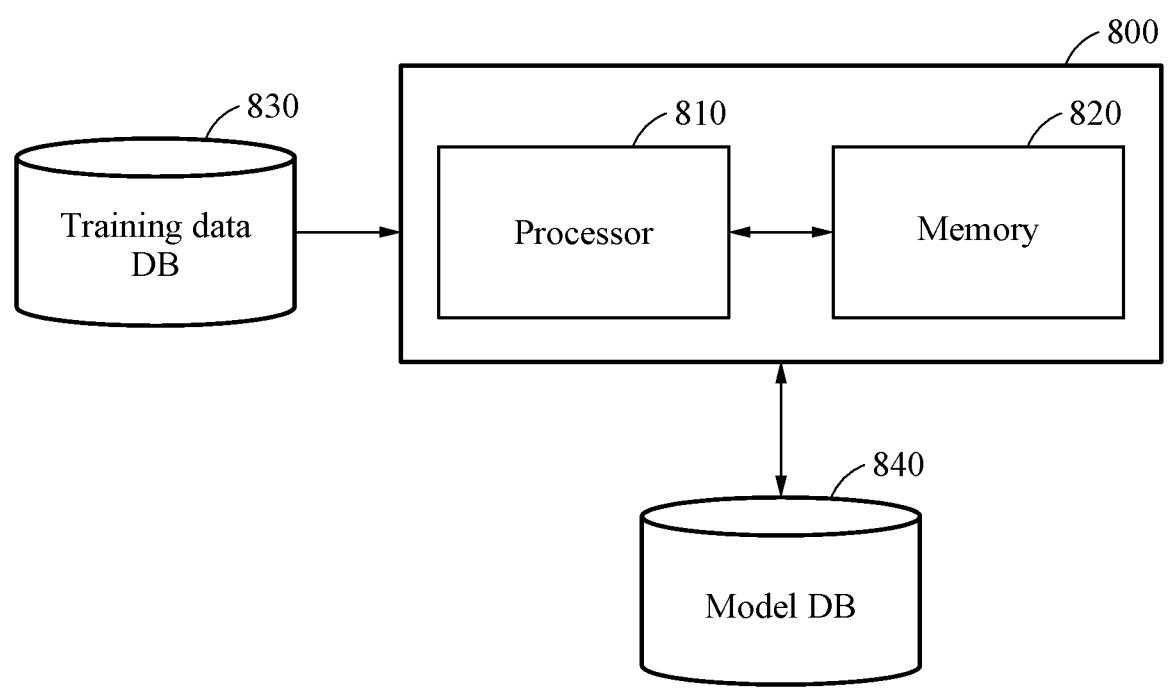
FIG. 8 illustrates an example of a training apparatus.

FIG. 8 illustrates an example of a training apparatus.

Referring to FIG. 8, a training apparatus 800 may include a memory 820 to store instructions executable by a processor 810, and the processor 810 to perform training of a classifier by executing the instructions stored in the memory 820.

The processor 810 may train neural network models that are used in a multi-scale classifier, a weight determiner, and a feature extractor stored in a model database 840. Herein, the term "training" may refer to "machine learning" of a computer.

The processor 810 may train the neural network model to be used to determine weights, based on training images stored in a training data database 830. The neural network model may receive detection information of an object region detected in a training image and score information obtained from a multi-scale classifier, and output weights corresponding to the scores. A desired output for an output of the neural network model may be determined based on the scores obtained from the multi-scale classifier.

Assuming that the multi-scale classifier includes three classifiers and that the classifiers are configured to output scores $S_1$, $S_2$, and $S_3$, desirable weights $\hat{w}_1$, $\hat{w}_2$, $\hat{w}_3$ to be output from the neural network models may be expressed by Equation 1.

$$\hat{w}_1 = \frac{S_1^\alpha}{S_1^\alpha + S_2^\alpha + S_3^\alpha} \quad \hat{w}_2 = \frac{S_2^\alpha}{S_1^\alpha + S_2^\alpha + S_3^\alpha} \quad \hat{w}_3 = \frac{S_3^\alpha}{S_1^\alpha + S_2^\alpha + S_3^\alpha}$$ [Equation 1]

Here, the weights $\hat{w}_1$, $\hat{w}_2$, $\hat{w}_3$ are desirable weights corresponding to the scores $S_1$, $S_2$, and $S_3$, respectively, where a is an adjustable constant greater than or equal to "1".

If the weights $w_1$, $w_2$, and $w_3$ are output from the neural network model based on a training image, the processor 810 may calculate errors between the weights $w_1$, $w_2$, and $w_3$ and the desirable weights $\hat{w}_1$, $\hat{w}_2$, $\hat{w}_3$, and update parameters of the neural network model so as to reduce the calculated errors.

The processor 810 may repeatedly perform a process of detecting an object region in each training image and training the neural network model of the weight determiner as described above based on detection information of the object region.

The object recognition apparatus 100, object region detector 110, a multi-scale classifier 120, weight determiner 130, final score determiner 140, object recognition determiner 150, first classifier 335, second classifier 345, third classifier 355, weight determiner 360, weight determiner 420, feature extractor 410, and other apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an FPGA, a programmable logic unit (PLU), a central processing unit (CPU), a graphics processing unit (GPU), a neural processing unit (NPU), or any other device capable of responding to and executing instructions in a defined manner.

The methods illustrated in FIGS. 2-5 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the object recognition method. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented object recognition method, comprising:
   detecting feature regions in an object region comprising an object in an input image;
   determining respective score of each of the feature regions in the input image;
   in response to a detected feature for the object region satisfying an object recognition performance decrease condition, based on the respective scores and detection information of the object region comprising a position of the object region in the input image, through a neural network model, determining respective weights of each of the feature regions and applying to the respective scores, wherein values of the respective weights adaptively change according to the detection information of the object region and the respective scores of the feature regions such that the respective scores are adjusted by the respective weights;

determining a final score based on a result of applying the determined respective weights to the respective scores; and recognizing the object based on the final score, wherein the determining of the respective weights comprises:

determining a first weight corresponding to a first score that corresponds to a first feature region based on the detection information of the object region and the scores; and determining a second weight corresponding to a second score that corresponds to a second feature region based on the detection information of the object region and the scores.

2. The object recognition method of claim 1, wherein the position comprises any one or any combination of a width of each of the object regions, a height of each of the object regions, and coordinates of a reference point related to each of the object regions.

3. The object recognition method of claim 1, wherein the determining of the respective scores comprises determining the respective scores using classifiers, and the determining of the weights comprises determining the weights based on the respective scores, the detection information of the object regions, and feature information obtained from at least one of the classifiers.

4. The object recognition method of claim 3, wherein the feature information comprises a feature value output from an intermediate layer of at least one of the classifiers.

5. The object recognition method of claim 1, wherein the determining of the final score comprises determining the final score based on applying the first weight to the first score and applying the second weight to the second score.

6. The object recognition method of claim 1, wherein each of the object regions corresponds to a face region in the input image, and the object regions comprise the face region and a partial region including at least one face component in the face region.

7. A non-transitory computer-readable storage medium storing instructions that, when executed by a processor, cause the processor to perform the object recognition method of claim 1.

8. The object recognition method of claim 1, wherein the object recognition performance decrease condition comprises any one or any combination of more than one object regions in the input image, detected the object region at predefined positions in the input image, and all components of the object not being detected.

9. The method of claim 1, wherein the feature regions comprise any one or any combination of different sizes or represent different regions, at least partly overlap another feature region.

10. The method of claim 1, wherein the final score is a weighted sum of the respective scores adjusted by the respective weights.

11. A processor-implemented object recognition method, comprising:

detecting feature regions in an object region comprising an object in an input image;

determining respective scores of each of the object regions in the input image;

in response to a detected feature of the object region satisfying an object recognition performance decrease condition, based on the respective scores and detection information of the object region comprising a position of the object region in the input image, through a neural network model, determining weights and applying to the respective scores, wherein values of the respective weights adaptively change according to the detection information of the object region and the respective scores of the feature regions such that the respective scores are adjusted by the respective weights;

determining a final score based on a result of applying the determined respective weights to the respective scores; and recognizing the object based on the final score, wherein the determining of the respective weights comprises:

determining a first weight corresponding to a first score that corresponds to a first feature region based on the detection information of the object region and the scores; and determining a second weight corresponding to a second score that corresponds to a second feature region based on the detection information of the object region and the scores.

12. The object recognition method of claim 11, wherein the position comprises any one or any combination of a width of each of the object regions, a height of each of the object regions, and coordinates of a reference point related to each of the object regions.

13. The object recognition method of claim 11, wherein the detected feature for the detected object region satisfying the object recognition performance decrease condition comprises at least one of the object regions being detected in the input image or the detected object region corresponding to an incompletely detected object region.

14. The object recognition method of claim 11, further comprising:

determining the final score based on the respective scores and a fixed weight, in response to the detected feature not satisfying the object recognition performance decrease condition.

15. The method of claim 11, wherein the feature regions comprise any one or any combination of different sizes or represent different regions, at least partly overlap another feature region.

16. An object recognition apparatus, comprising:

a processor configured to:

detect an object region comprising an object in an input image;

determine respective scores of each of the object regions in the input image, in response to a detected feature of the object region satisfying an object recognition performance decrease condition, based on the respective scores and detection information of the object region comprising a position of the object region in the input image, through a neural network model, determine respective adaptive weights and applying to the respective scores, wherein values of the respective weights adaptively change according to the detection information of the object region and the respective scores of the feature regions such that the respective scores are adjusted by the respective weights;

determine a final score based on a result of applying the determined respective weights to the respective scores, and recognizing the object based on the final score, wherein the determining of the respective weights comprises:

determining a first weight corresponding to a first score that corresponds to a first feature region based on the detection information of the object region and the scores; and determining a second weight corresponding to a second score that corresponds to a second feature region based on the detection information of the object region and the scores.

17. The object recognition apparatus of claim 16, wherein the position comprises any one or any combination of a width of each of the object regions, a height of each of the object regions, and coordinates of a reference point related to each of the object regions.

18. The object recognition apparatus of claim 16, wherein the processor is further configured to:

determine the respective scores using classifiers, and determine the respective weights based on the respective scores, the detection information of the object regions, and feature information obtained from at least one of the classifiers.

19. The apparatus of claim 16, wherein the feature regions comprise any one or any combination of different sizes or represent different regions, at least partly overlap another feature region.

20. An electronic device, comprising:

a camera configured to acquire an input image; and a processor configured to perform object recognition based on the input image, wherein the processor is configured to:

detect feature regions in an object region comprising an object in the input image;

determine respective score corresponding to each of the feature regions of the object region;

in response to a detected feature of the object regions satisfying an object recognition performance decrease condition, based on the respective scores and detection information of the object region comprising a position of the object region in the input image, through a neural network model, determine respective weights and applying to the respective scores, wherein values of the respective weights adaptively change according to the detection information of the object region and the respective scores of the feature regions;

determine a final score based on a result of applying the determined respective weights to the respective scores, and recognize the object based on the final score, wherein the determining of the respective weights comprises:

determining a first weight corresponding to a first score that corresponds to a first feature region based on the detection information of the object region and the scores; and determining a second weight corresponding to a second score that corresponds to a second feature region based on the detection information of the object region and the scores.

* * * * *